Oct. 9, 1945.　　　E. W. BULLOCK　　　2,386,432
INDEX MECHANISM
Filed Dec. 29, 1943　　　2 Sheets-Sheet 1

Inventor
EDWARD W. BULLOCK
By
B. E. Schlesinger
Attorney

Oct. 9, 1945.  E. W. BULLOCK  2,386,432
INDEX MECHANISM
Filed Dec. 29, 1943   2 Sheets-Sheet 2
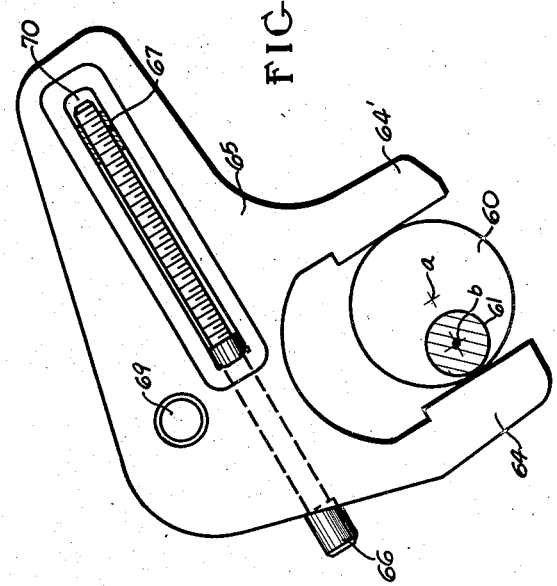
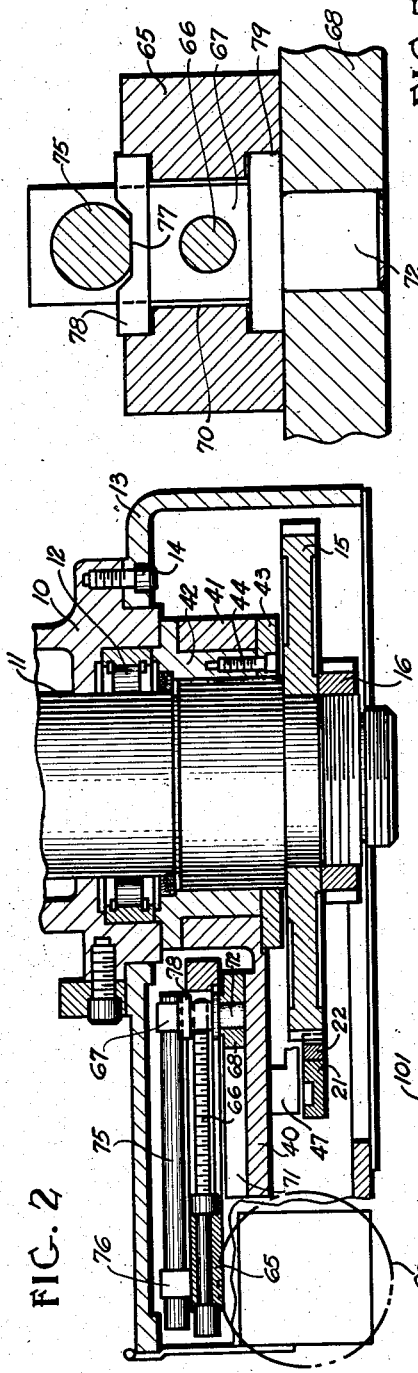
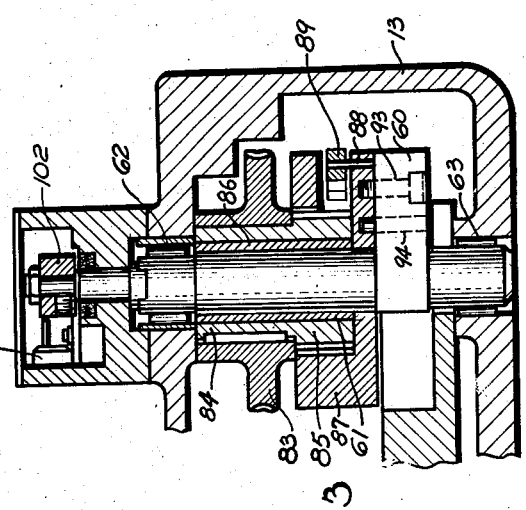
Inventor
EDWARD W. BULLOCK
By B. E. Shlesinger
Attorney Patented Oct. 9, 1945

2,386,432

UNITED STATES PATENT OFFICE 2,386,432

INDEX MECHANISM

Edward W. Bullock, Rochester, N. Y., assignor to Gleason Works, Rochester, N. Y., a corporation of New York Application December 29, 1943, Serial No. 516,040

18 Claims. (Cl. 90—57)

The present invention relates to indexing mechanisms and particularly to indexing mechanisms of the type employed on machines for producing gears.

One object of this invention is to provide an indexing mechanism which will be substantially noiseless in operation.

A further object of the invention is to provide an indexing mechanism which may be operated at high speed without shock or vibration.

Another object of the invention is to provide an indexing mechanism in which the indexing operation is positively controlled at all times and possibility of inaccurate indexing is eliminated.

Still another object of the invention is to provide an indexing mechanism which is readily adjustable to afford a wide range of indexing action, and which can be adjusted to operate with maximum efficiency for any given number of teeth in the work.

Other objects of the invention will be apparent hereinafter from this specification and from the recital of the appended claims.

In the drawings:

Fig. 2 is a sectional view of the index mechanism taken on the line 2—2 of Fig. 1;

Fig. 3 is a section on the line 3—3 of Fig. 1;

Fig. 4 is a detail view showing the slow-start and slow-stop mechanism for effecting the indexing operation; and Fig. 5 is a sectional view on an enlarged scale, showing in detail the means for locking the parts through which the angle of indexing movement is adjusted, after adjustment of those parts.

Figure 1:
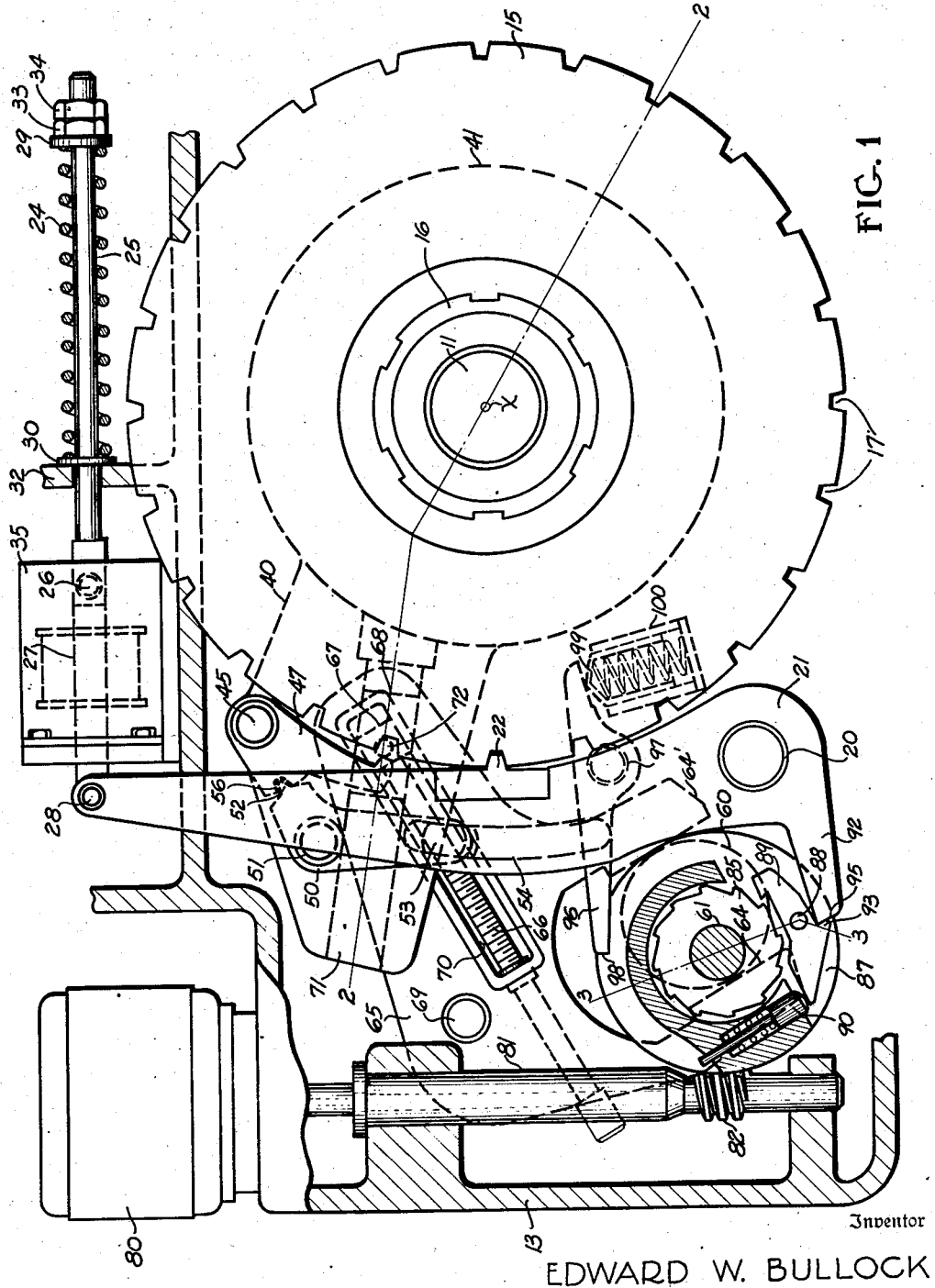
Fig. 1 is an elevation, with parts in section, of an indexing mechanism constructed according to one embodiment of the present invention.

The indexing mechanism of the present invention is of the notched plate type and is particularly adapted for use on gear roughing and gear finishing machines in which the cutting or grinding operations are performed without a generating roll.

In the drawings, 10 denotes the work head of the gear cutting or gear grinding machine on which the index mechanism of the present invention is employed and 11 denotes the work spindle of this machine. This spindle is journaled in the work head on suitable bearings of which one is shown at 12. The indexing mechanism itself is enclosed within a housing 13 that is secured to the work head 10 by screws 14.

15 denotes the index plate. This plate is keyed or otherwise fastened to the work spindle and is secured against a shoulder formed on the work spindle by a nut 16 that threads onto the work spindle. The index plate has a plurality of notches 17 whose number equals or is a multiple of the number of teeth in the gear to be cut or ground on the machine. The sides of these notches preferably converge inwardly and are of straight profile, and ordinarily extend radially of the axis $x$ of the spindle and index plate.

Pivotally mounted upon a pin or stud 20, that is secured in the index housing 13, is a lever 21. This lever carries a locking dog 22, which is adapted to be engaged with the notches 17 of the index plate, to hold the work spindle against rotation during cutting or grinding. The locking dog 22 is held in locking position and is constantly urged toward locking position by a coil spring 24. This spring is mounted on a rod 25 which is connected through a pin 26 with a bar 27 that in turn is pivotally connected by the pin 28 with one end of the lever 21. The spring 24 is interposed between a washer 29 and a washer 30. The washer 30 seats against a rib 32 formed on the index housing 13, while the washer 29 seats against a nut 33 which threads on the rod 25 and which may be adjusted on the rod to adjust the tension of the spring. A lock nut 34 is provided to hold the nut 33 in any adjusted position. The bar 27 is the armature of a standard solenoid 35 which is fastened in the index housing, which, when energized, serves to draw the rod 25 to the left from the position shown in Fig. 1, against the resistance of the spring 24, to rock the lever 21 about its pivot 20 and disengage the lock dog 22 from the index plate 15.

40 denotes an arm which is provided with a hub portion 41. The arm is journaled by means of its hub on a bearing member 42 which is coaxial with the work spindle and which is secured to the work head 10 in any suitable manner. The arm 40 is held against axial movement relative to the bearing member 42 by a cap-plate 43 which is secured to the bearing member by screws 44 and which engages the hub portion 41 of the arm.

Pivotally mounted upon the arm 40 by means of the pin 45 is a pawl 47. This pawl is adapted to be engaged successively with successive notches of the index plate 15, when the lock dog 22 is disengaged from the index plate, to rotate the index plate and effect indexing of the work spindle. The pawl is positively connected with the lever arm 21 so that as the lock dog 22 is being disengaged from a notch of the index plate 15, the pawl 47 is moved positively into engagement with another notch of that plate, and vice versa, when the lock dog 22 is moved back into engagement with a notch of the index plate, the pawl 47 is disengaged therefrom. The positive connection of the pawl 47 and lever arm 21 is through a double armed lever 50 which is pivotally mounted on the arm 40 by means of the pin 51. One arm of this lever 50 is formed at its extremity with a gear tooth 52 and the other arm of the lever 50 is formed with a boss 53 which engages in an arcuate slot 54 that is provided in the lever 21. The tooth 52 of the lever 50 engages in a tooth space or notch 56 that is provided in the pawl 47. The connections between the lever 21 and lever 50 and between lever 50 and pawl 47 are such that when the lever 21 is rocked on its pivot 20, the lever 50 is rocked in one direction on its pivot 51, and the pawl 47 is rocked in the opposite direction on its pivot 45.

Indexing of the work spindle is effected by rotating the arm 40, after the pawl 47 has been engaged with the index plate 15. Rotation of the arm 40 is effected by rotation of the crank or eccentric 60. This member is formed integral with a shaft 61 (Fig. 3) that is journaled on suitable bearings 62 and 63 in the housing 13. The center of the eccentric 60 is denoted at $a$ in Fig. 4 and the axis of the shaft 61 at $b$.

The eccentric 60 engages at diametrically opposite points with the two arms 64 and 64' of a link member 65 whose shape is clearly shown in Fig. 4. This member is pivotally mounted by means of pin 69 in the housing 13, and it is adjustably connected through the screw shaft 66, block 67, and block 68 (Figs. 1, 2, and 5) with the arm 40. The block 67 is adjustably mounted to slide in a slot 70 provided in the link member 65. It is adjusted therein by the screw shaft 66 which is journaled in the link member 65. The block 68 is slidably mounted in a slot 71 of the arm 40, and the block 67 is pivotally connected with the block 68 by means of a stud or pin 72 which is integral with the block 67 and which is pivotally mounted in the block 68.

Obviously, as the eccentric 60 rotates, it imparts an oscillatory motion to the arm 40. The extent of this motion is determined by the position of the block 67 in the slot 70 which is adjusted by rotation of the screw shaft 66. For cutting or grinding a gear of a given tooth number, ordinarily an index plate 15 will be used, the number of whose notches is equal to the number of teeth in the gear to be produced. However, for any gear an index plate may be used, the number of whose notches 17 is a multiple of the number of teeth in the gear. The screw 66 and blocks 67 and 68 permit of adjusting the throw or swing of the arm 40 through the angle required on any given job, and permit of positioning the pawl 47 in alignment with a notch of the index plate so that when the pawl is moved into engaging position, it will engage in a notch of the plate.

After adjustment, the block 67 may be locked in adjusted position by manipulation of the locking bar 75 (Figs. 2 and 5). This locking bar extends parallel to the screw shaft 66 and is rotatably mounted at one end in a bearing 76 and at its opposite end in the block 67. The bearing 76 is integral with the link member 65. The bar 75 has a flatted portion 77 which is adapted to engage a clamping plate 78 that is mounted to slide on the block 67. The block 67 is formed with a shoulder portion 79 that engages in an enlarged portion of slot 70 formed on one side face of link member 65. The clamping plate 78 is adapted to seat in an enlarged portion of slot 70 formed on the other side face of link member 65. In Fig. 5, the bar 75 and clamping plate 78 are shown in released position, but when the bar 75 is rotated from this position, it will be seen that the clamping plate 78 will be forced downwardly and the shoulder portion 79 of the block 67 pulled upwardly. Thus, the block 67 will be securely clamped in its adjusted position in the slot 70 of link member 65.

The eccentric 60 is adapted to be driven by a motor 80 (Fig. 1) which is mounted on the index housing 13. The armature shaft of this motor is connected through any suitable coupling to an aligned shaft 81 that is journaled in the index housing. This shaft 81 has a worm 82 formed integral with it which meshes with a worm wheel 83 (Fig. 3). The worm wheel 83 is keyed to the sleeve portion 84 of the ratchet wheel 85. This ratchet wheel is journaled by means of the bushing 86 on the shaft 61.

Fastened to the eccentric 60 by screw 93 and dowel 94 is the stop-plate 87. This stop-plate is recessed to surround the ratchet wheel 85 and is coaxial therewith.

The stop-plate is provided on its periphery with an arcuate slot in which there is pivoted by means of pin 88 a pawl 89. This pawl is constantly urged into engagement with the ratchet wheel 85 by action of a spring pressed plunger 90 which is housed in the stop-plate 87 and which engages the tail of the pawl. The pawl 89 is held out of engagement with the ratchet wheel by the tail-part 92 of lever 21. This is adapted to engage the lug 93 formed on the pawl 89. The tail portion 92 of the lever 21 is also adapted to engage a shoulder 95 formed on the stop-plate 87 to hold the stop-plate against rotation in one direction when the locking dog 22 is engaged with the index plate 15. The stop-plate is at this time also held against rotation in the opposite direction by a dog 96 which is pivotally mounted by means of the pin 97 in the index housing and which is adapted to engage the shoulder 98 formed on the stop-plate approximately diametrically opposite the shoulder 95. The dog 96 is constantly urged toward locking position by means of the spring pressed plunger 99 which is housed in a block 100 that is secured to the index housing.

The motor 80 through the worm 82 and the worm wheel 83 serves to rotate the ratchet wheel 85 continuously, but the rotation of the ratchet wheel is only transmitted to the eccentric 60 when the pawl 89 is in engagement with the ratchet wheel. This only occurs when the pawl 89 is released. When the locking dog 22 is in locking position, the tail portion 92 of the lever 21 engages the lug portion 93 of the pawl and holds the pawl out of engagement with the ratchet wheel 85. During this time the eccentric 60 is stationary.

The indexing mechanism is shown in Fig. 1 in its locked-up position. Here the lock dog 22 is in engagement with a notch 17 of the index plate 15 and is held in this position by action of the coil spring 24. Here, the pawl 47 is in retracted position, as is also the pawl 89, and here the stop-plate 87 is held against rotation by engagement therewith of the dog 96 and of the tail portion 92 of lever 21.

When the solenoid 35 is energized, the rod 25 is pulled to the left from the position shown in Fig. 1 against the resistance of the spring 24 and the lever 21 is rocked about its pivot 20 to with-draw the locking dog 22 from locked position. Simultaneously through the block and slot connection 53—54 of the lever 50 with the lever 21 and through the toothed connection 52—56 of the lever 50 with the pawl 47, the pawl 47 is moved into engagement with the index plate 15. As soon as the dog has cleared the index plate and the pawl 47 has engaged the plate, the pawl 89 will engage the ratchet wheel 85, because when the locking dog 22 is in withdrawn position, the tail portion 92 of the lever 21 will clear the lug portion 93 of the pawl 89, and the spring pressed plunger 90 will force the pawl 89 into engagement with the ratchet wheel 85. This ratchet wheel, as already described, is rotating continuously. Hence, on engagement of pawl 89 with the ratchet wheel, the motion of the ratchet wheel will be transmitted through the pawl 89 to the stop-plate 87. The gearing between motor 80 and stop-plate 87 is so arranged that the stop-plate will revolve in a counterclockwise direction as viewed in Fig. 1. Hence, the lock dog 96 will simply be kicked out of the way as soon as the stop-plate begins to revolve. As the stop-plate revolves, the eccentric 60, which is secured to it, revolves also. This causes the arm 40 to be rocked about the axis of the work spindle 11 through the operation of the link member 65, block 67, and block 68. Thus, the index plate 15 will be rotated by the pawl 47 a distance sufficient to index the work spindle through the required angle until the notch 17 of the index plate, with which the pawl is in engagement, is aligned with locking dog 22. Then through the deenergization of the solenoid 35, the spring 24 will return the locking dog 22 into engagement with that notch of the index plate with which the pawl 47 has been engaged and the work spindle will be locked up again. As the locking dog returns into engagement with the index plate, the pawl 47 is retracted from driving position, through operation of the lever 50 and the toothed connection between this lever and the pawl 47. At the same time, also, the tail portion 92 of the lever 21 will be moved into position where it will engage the lug portion 93 of the pawl 89 to retract this pawl from engagement with the ratchet wheel 85 and as soon as the shoulder 95 of the stop-plate comes into engagement with the tail portion 92 of the lever 21, the rotation of stop-plate 87 will be stopped. As soon as the stop-plate is stopped, the spring-pressed plunger 99 returns the lock dog 96 to locking position to prevent reverse movement of the stop-plate. During the continued rotation of the stop-plate after the pawl 47 as been retracted from driving position and before the tail 92 of lever 21 engages the shoulder 95 of the stop-plate, the arm 40 is rocked back to original position to reset the index mechanism. This completes the indexing cycle.

The pawl 47 and locking dog 22 are spaced axially of the work spindle, and the length from front to rear of the notches 17 of the index plate is sufficient to insure that the pawl and locking dog will not interfere with one another and that both may be engaged alternately with these notches.

The solenoid 35 is intended to be energized in time with the cutting or grinding cycle of the machine. For this purpose, it may be energized through operation of a standard limit switch tripped by the feed cam of the machine and actuated after each tooth space of the work has been cut or ground. It may be desirable, however, to provide separate means for deenergizing the solenoid, so as to deenergize it slightly ahead of the completion of the indexing movement, thereby to insure that the index plate 15 will not be carried beyond the locking dog 22. For this purpose, a cam 102 (Fig. 3) of suitable form may be fastened to the shaft 61 to actuate a limit switch 101, and this limit switch may be so connected in the circuit to the solenoid 35 as to deenergize the solenoid when tripped. Thus, the solenoid may be deenergized at any time after the index plate 15 has begun to rotate in the indexing movement. The lock dog 22 can then ride on the periphery of the index plate during the rest of the indexing movement, and as soon as it registers with a notch of the index plate, it will be forced into engagement with that notch by action of the spring 24. Thus any possibility of the work spindle being revolved too far in indexing will be eliminated.

The eccentric 60 operates to impart a slow-start and slow-stop movement to the arm 40. In prior types of index mechanisms, the arm in its movement first causes disengagement of the locking dog and then rotation of the index plate, so that the arm is travelling at relatively high speed when the index pawl starts to drive the index plate. Consequently with prior types of index mechanisms there is some shock attached to the initial indexing movement. With the mechanism of the present invention, the index pawl is engaged with the index plate before the arm starts to move. Hence, the index plate starts to rotate at slow speed and without shock or noise.

While the invention has been described in connection with a particular embodiment thereof, it will be understood that it is capable of further modification. This application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In an index mechanism, the combination with a support and a work spindle journaled in the support, of a notched plate secured to the spindle, a lock-dog movably mounted on said support and adapted to engage said plate to hold the spindle against rotation relative to the support, an arm mounted for rotation coaxially of the spindle, a pawl movably mounted on the arm and adapted to engage the plate to rotate the plate on rotation of the arm in one direction, toothed gearing positively connecting the dog and the pawl so that when one is moved into engagement with the plate the other is disengaged therefrom, means constantly urging the dog into engaging position, means operable independently of the arm for periodically disengaging the dog from the plate, and means for rotating the arm, after the pawl is in engagement with the plate and the dog has been disengaged therefrom, to index the spindle.

2. In an index mechanism, the combination with a support and a work spindle journaled therein, of a notched plate secured to said spindle, a lever pivotally mounted on said support, a lock-dog carried thereby and adapted to engage the notches of said plate to hold the spindle against rotation relative to the support, an arm rotatably mounted coaxially of the spindle, a pawl pivotally mounted on the arm and adapted to engage a notch of the plate to rotate the plate on rotation of the arm, means for constantly urging the lever in one direction about its pivot to cause the lock-dog to engage the plate, means for periodically moving the lever in the opposite direction about its pivot to disengage the dog from the plate, a double armed lever pivotally mounted on the arm and having a pin and slot connection at one end with the first named lever and a geared connection at its opposite end to the pawl so that when the first named lever is moved in one direction, the pawl is moved in the opposite direction, and means for rotating the arm, when the pawl is in engagement with the plate, to index the work spindle.

3. In an index mechanism, the combination with a support and a work spindle journaled therein, of a notched plate secured to the spindle, a lock-dog movably mounted on the support and adapted to engage said plate to hold the spindle against rotation relative to the support, an arm rotatably mounted coaxially of the spindle, a pawl movably mounted on the arm and adapted to engage the plate to rotate the plate on rotation of the arm in one direction, means constantly urging the dog into engaging position, means for periodically moving the dog to disengaged position, means for moving the pawl into engaged position on disengagement of the dog, and means for rotating the arm at a varying velocity of a slow-start nature, after the pawl is in engaged position, and the lock-dog is in disengaged position to index the work spindle.

4. In an index mechanism, the combination with a support and a work spindle journaled therein, of a notched plate secured to the spindle, a lock-dog movably mounted on the support and adapted to engage said plate to hold the spindle against rotation relative to the support, an arm rotatably mounted coaxially of the spindle, a pawl movably mounted on the arm and adapted to engage the plate to rotate the plate on rotation of the arm in one direction, means constantly urging the dog into engaging position, means for periodically moving the dog to disengaged position, means for moving the pawl into engaged position on disengagement of the dog, an eccentric, means connecting the eccentric with the arm to oscillate the arm on rotation of the eccentric, said means being adjustable to vary the amount of oscillation of the arm on rotation of the eccentric, means preventing start of rotation of the eccentric until the dog has been disengaged from the plate and the pawl has been engaged therewith, and means for rotating the eccentric upon disengagement of the dog.

5. In an index mechanism, the combination with a support and a work spindle journaled therein, of a notched plate secured to the spindle, a lock-dog movably mounted on the support and adapted to engage said plate to hold the spindle against rotation relative to the support, an arm rotatably mounted coaxially of the spindle, a pawl movably mounted on the arm and adapted to engage the plate to rotate the plate on rotation of the arm, means constantly urging the dog into engaging position, means for periodically moving the dog to disengaged position, means for moving the pawl to engaging position on disengagement of the dog, an eccentric operatively connected to the arm to oscillate the arm, said connection comprising a member engaging said eccentric, a block adjustably mounted in said member, and a second block slidably mounted in said arm and pivotally connected to the first block, and means for rotating the eccentric.

6. In an index mechanism, the combination with a support and a work spindle journaled therein, of a notched plate secured to the spindle, a lock-dog movably mounted on the support and adapted to engage said plate to hold the spindle against rotation relative to the support, an arm rotatably mounted coaxially of the spindle, a pawl movably mounted on the arm and adapted to engage the plate to rotate the plate on rotation of the arm, means constantly urging the dog into engaging position, means for moving the pawl into engaging position on disengagement of the dog, a constantly rotating shaft, means for periodically moving the dog to disengaged position, and means operative on such movement to cause said shaft to be connected to said arm to rotate said arm.

7. In an index mechanism, the combination with a support and a work spindle journaled therein, of an index plate secured to the spindle, a lock-dog movably mounted on the support and adapted to engage said plate to hold the spindle against rotation relative to the support, an arm rotatably mounted coaxially of the spindle, a driving pawl movably mounted on the arm and adapted to engage the plate to rotate the spindle on rotation of the arm, means constantly urging the dog into engaging position, means for moving the pawl into engaging position on movement of the dog to disengaged position, a constantly rotating shaft, a ratchet wheel carried thereby, a member operatively connected to said arm, a pawl carried by said member, means constantly urging said second named pawl into engagement with the ratchet wheel to connect said shaft to said arm to drive said arm, means operatively connected with the dog to hold the last named pawl out of engaging position when the dog is engaged with the index plate, and means for periodically moving the dog to disengaged position.

8. In an index mechanism, the combination with a support and a work spindle journaled therein, of an index plate secured to the spindle, a lock-dog movably mounted on the support and adapted to engage the plate to hold the spindle against rotation relative to the support, an arm rotatably mounted coaxially of the spindle, a driving pawl movably mounted on the arm and adapted to engage the plate to rotate the plate on rotation of the arm, means constantly urging the dog into engaging position, means for moving the driving pawl into engaging position on disengagement of the dog, a constantly rotating shaft, a ratchet wheel carried thereby, an eccentric for driving said arm, a pawl for connecting the eccentric with the ratchet wheel to transmit rotation of the shaft to the eccentric, means constantly urging the second named pawl into engagement with the ratchet wheel, means operatively connected to the dog to hold the second named pawl out of engaging position when the dog is engaged with the index plate, and means for periodically moving the dog to disengaged position.

9. In an index mechanism, the combination with a support and a work spindle journaled therein, of an index plate secured to the spindle, a lever pivotally mounted on the support, a lock-dog secured to said lever and adapted to engage the plate to hold the spindle against rotation relative to the support, means for constantly urging the lever in one direction about its pivot to move the lock-dog to locking position, means for periodically moving the lever in the opposite direction about its pivot to move the lock-dog to released position, an arm rotatably mounted coaxially of the spindle, a driving pawl movably mounted on the arm and adapted to engage the plate to rotate the plate on rotation of the arm, means for moving the driving pawl into engaging position on movement of the dog to released position, a constantly rotating shaft, a member adapted to be connected to said shaft to rotate said arm, means for coupling said member with the shaft, means for constantly urging the coupling means into operative position, and means carried by the lever for holding the coupling means in inoperative position when the dog is engaged with the index plate.

10. In an index mechanism, the combination with a support and a work spindle journaled therein, of an index plate secured to the spindle, a lever pivotally mounted on the support, a lock-dog secured to the lever and adapted to be engaged with the plate to hold the spindle against rotation relative to the support, means constantly urging the lever in one direction about its pivot to move the dog into locking position, means for periodically moving the lever in the opposite direction about its pivot to move the lock-dog to released position, an arm rotatably mounted coaxially of the spindle, a driving pawl movably mounted on the arm and adapted to engage the index plate to rotate the plate on rotation of the arm, means for moving the driving pawl into engaging position on movement of the dog to released position, a constantly rotating shaft, a ratchet wheel secured to this shaft, a member adapted to be connected to the shaft to rotate said arm, a pawl carried by said member for engaging said ratchet wheel to connect said member to the shaft, and means for constantly urging said last named pawl into engagement with the ratchet wheel, said lever being formed with a tail portion that engages the last named pawl to hold the last named pawl in disengaged position when the dog is engaged with the index plate.

11. In an index mechanism, the combination with a support and the work spindle journaled therein, of an index plate secured to the spindle, a lever pivotally mounted on the support, a lock-dog secured to the lever and adapted to be engaged with the plate to hold the spindle against rotation relative to the support, means constantly urging the lever in one direction about its pivot to move the lock-dog into locking position, means for periodically moving the lever in the opposite direction about its pivot to move the lock-dog to released position, an arm rotatably mounted coaxially of the spindle, a driving pawl movably mounted on the arm and adapted to engage the plate to rotate the plate on rotation of the arm, means for positively connecting the driving pawl with the dog to move the driving pawl into engagement with the plate on movement of the dog to released position and vice versa, a constantly rotating shaft, a ratchet wheel carried by the shaft, an eccentric for oscillating said arm, a pawl connected to the eccentric and adapted to engage said ratchet wheel to connect said shaft to the eccentric to drive the eccentric, means for constantly urging said last named pawl into engagement with the ratchet wheel, said lever being formed with a tail portion that engages the last named pawl to hold the last named pawl in disengaged position when the dog is engaged with the index plate.

12. In an index mechanism, the combination with a support and a work spindle journaled therein, of an index plate secured to the spindle, a lock-dog adapted to engage said plate to hold the spindle against rotation relative to the support, means for moving the dog into engagement with the plate, an arm mounted coaxially of the spindle, a pawl carried by the arm and adapted to engage the plate to rotate the plate on rotation of the arm in one direction, means positively connecting the pawl with the dog to move the pawl into engagement with the plate on disengagement of the dog therefrom and vice versa, means for periodically disengaging the dog from the plate, means for rotating the arm, and means preventing start of rotation of the arm until the pawl has been engaged with the plate and the dog has been disengaged therefrom.

13. In an index mechanism, the combination with a support and a work spindle journaled therein, of an index plate secured to the spindle, a lock-dog adapted to engage said plate to hold the spindle against rotation relative to the support, means for moving the dog into engagement with the plate, an arm mounted coaxially of the spindle, a pawl carried by the arm and adapted to engage the plate to rotate the plate on rotation of the arm in one direction, means positively connecting the pawl with the dog to move the pawl into engagement with the plate on disengagement of the dog therefrom and vice versa, means for periodically disengaging the dog from the plate, means for oscillating the arm at a varying velocity of a slow-start and slow-stop character, and means preventing start of the oscillating movement until the pawl has been engaged with the plate and the dog has been disengaged therefrom.

14. In an index mechanism, the combination with a support and a work spindle journaled therein, of an index plate secured to the spindle, a lock-dog adapted to engage said plate to hold the spindle against rotation relative to the support, means for moving the dog into engagement with the plate, an arm mounted coaxially of the spindle, a pawl carried by the arm and adapted to engage the plate to rotate the plate on rotation of the arm in one direction, means for periodically disengaging the dog from the plate, means for engaging the pawl with the plate on disengagement of the dog, means for oscillating the arm at a varying velocity of a slow-start and slow-stop character, and means operatively connected to the dog for preventing start of oscillation of the arm until the pawl has been engaged with the plate and the dog has been disengaged therefrom.

15. In an index mechanism, the combination with a support and a work spindle journaled therein, of an index plate secured to the spindle, a lock-dog adapted to engage said plate to hold the spindle against rotation relative to the support, means for moving the dog into engagement with the plate, an arm mounted coaxially of the spindle, a pawl carried by the arm and adapted to engage the plate to rotate the plate on rotation of the arm in one direction, means positively connecting the pawl with the dog to move the pawl into engagement with the plate on disengagement of the dog therefrom and vice versa, means for periodically disengaging the dog from the plate, means for oscillating the arm at a varying velocity of a slow-start and slow-stop character, means preventing movement of the arm until the pawl has been engaged with the plate and the dog has been disengaged therefrom, and means operatively connected with the lock-dog for stopping oscillation of the arm after it has returned to its initial position.

16. In an index mechanism, the combination with a support and a work spindle journaled therein, of an index plate secured to the spindle, a lock-dog adapted to engage said plate to hold the spindle against rotation relative to the support, means for constantly urging the dog into engagement with the plate, an arm mounted coaxially of the spindle, a pawl carried by the arm and adapted to engage the plate to rotate the plate on swing of the arm in one direction and adapted to be returned to starting position on swing of the arm in the opposite direction, means positively connecting the pawl with the dog to move the pawl into engagement with the plate on disengagement of the dog therefrom and vice versa, means for periodically disengaging the dog from the plate, an eccentric connected to the arm to oscillate the arm on rotation of the eccentric, means for rotating the eccentric, means for preventing rotation of the eccentric until the pawl has been engaged with the plate and the dog has been disengaged therefrom, and means operatively connected with the dog to stop the rotation of the eccentric after it has made a revolution.

17. In an index mechanism, the combination with a work support and a work spindle journaled therein, of a notched index plate secured to said spindle, a lock dog movably mounted on the work support and adapted to engage a notch of the plate to hold the work spindle against rotation relative to the support, an arm oscillatably mounted on the spindle coaxially thereof, a pawl mounted on the arm for movement into and out of engagement with the notches of the plate and adapted, when in engagement with a notch, to index the work spindle on swing of the arm in one direction, means positively connecting the dog and the pawl so that when one is moved into engagement with the plate the other is moved out of engagement, means for swinging the arm in opposite directions to effect indexing and return movements thereof, means preventing start of the swinging movement until after the dog has been disengaged from the plate and the pawl has been engaged therewith, means for periodically moving the dog to disengaged position for a predetermined part of the indexing swing of the arm, and means for adjusting the amount of swinging movement of the arm so that, on the return swing of the arm, the pawl is returned to a position of alignment with one of the notches of the plate.

18. In an index mechanism, the combination with a work support and a work spindle journaled therein, of a notched index plate secured to said spindle, a lock dog movably mounted on the work support and adapted to engage a notch of the plate to hold the work spindle against rotation relative to the support, an arm oscillatably mounted on the spindle coaxially thereof, a pawl mounted on the arm for movement into and out of engagement with the notches of the plate and adapted, when in engagement with a notch, to index the work spindle on swing of the arm in one direction, means positively connecting the dog and pawl so that when one is moved into engagement with the plate the other is moved out of engagement, means for swinging the arm in opposite directions at a varying velocity of a slow start and stop nature to effect indexing and return movements of the arm, means preventing the start of the swinging movement until after the dog has been disengaged from the plate and the pawl has been engaged therewith, means for periodically moving the dog to disengaged position for a predetermined part of the indexing swing of the arm, and means for adjusting the amount of swinging movement so that on the return swing of the arm the pawl is returned to a position of alignment with one of the notches of the plate.

EDWARD W. BULLOCK.